(12) United States Patent
Nanni

(10) Patent No.: US 10,362,464 B2
(45) Date of Patent: Jul. 23, 2019

(54) OVER-THE-AIR BROADCAST BOOTLOADER PROTOCOL

(71) Applicant: Silicon Laboratories, Inc., Austin, TX (US)

(72) Inventor: Maurizio Nanni, Cambridge, MA (US)

(73) Assignee: Silicon Laboratories, Inc., Austin, TX (US)

(*) Notice: Subject to any disclaimer, the term of this patent is extended or adjusted under 35 U.S.C. 154(b) by 153 days.

(21) Appl. No.: 15/081,080

(22) Filed: Mar. 25, 2016

(65) Prior Publication Data

US 2017/0280267 A1 Sep. 28, 2017

(51) Int. Cl.
| | |
|---|---|
| *G06F 15/16* | (2006.01) |
| *H04W 4/50* | (2018.01) |
| *H04L 29/06* | (2006.01) |
| *H04W 4/06* | (2009.01) |
| *G06F 9/4401* | (2018.01) |
| *G06F 8/61* | (2018.01) |
| *H04W 4/80* | (2018.01) |
| *H04L 29/08* | (2006.01) |
| *H04L 1/16* | (2006.01) |
| *H04L 1/00* | (2006.01) |

(52) U.S. Cl.
CPC ............... *H04W 4/50* (2018.02); *G06F 8/63* (2013.01); *G06F 9/4416* (2013.01); *H04L 1/1614* (2013.01); *H04L 1/1685* (2013.01); *H04L 67/34* (2013.01); *H04L 69/166* (2013.01); *H04L 69/26* (2013.01); *H04W 4/06* (2013.01); *H04W 4/80* (2018.02); *H04L 1/16* (2013.01); *H04L 2001/0093* (2013.01)

(58) Field of Classification Search
CPC ....... H04W 4/001; H04W 4/008; H04W 4/06; G06F 8/63; G06F 9/4416; H04L 1/16; H04L 69/166
USPC .......................................................... 709/217
See application file for complete search history.

(56) References Cited

U.S. PATENT DOCUMENTS

| | | | | |
|---|---|---|---|---|
| 5,151,899 A | * | 9/1992 | Thomas | ................ H04L 1/1835 370/394 |
| 6,269,080 B1 | * | 7/2001 | Kumar | .................. H04L 1/1614 370/236 |

(Continued)

OTHER PUBLICATIONS

IEEE Computer Society, "Part 15.4: Low-Rate Wireless Personal Area Networks (LR-WPANs)" (IEEE STD 802.15.4), IEEE, 2011, p. 1-294.*

(Continued)

*Primary Examiner* — Taylor A Elfervig
(74) *Attorney, Agent, or Firm* — Nields, Lemack & Frame, LLC (57) ABSTRACT

A system and method of disseminating bootload images through a wireless network are disclosed. The central node, or server, transmits segments of the bootload image using broadcast so that all wireless network devices receive the image at the same time. The server then individually queries each wireless device to determine whether there are any segments of the image that were not received by that particular wireless device. The server then retransmits, using broadcast, any segment that was not received by any wireless device. Once every wireless device has the entire image, the server may initiate the process of installing that image.

18 Claims, 4 Drawing Sheets

(56) References Cited

U.S. PATENT DOCUMENTS

| | | | | |
|---|---|---|---|---|
| 6,496,481 B1* | 12/2002 | Wu | ............... | H04L 1/1628 |
| | | | | 370/242 |
| 6,574,668 B1* | 6/2003 | Gubbi | ............... | H04L 1/1614 |
| | | | | 709/231 |
| 6,601,207 B1* | 7/2003 | Vanttinen | ........... | H04L 1/1614 |
| | | | | 714/748 |
| 6,658,619 B1* | 12/2003 | Chen | ............ | H04L 1/1614 |
| | | | | 714/748 |
| 6,748,447 B1* | 6/2004 | Basani | ............ | H04L 67/1095 |
| | | | | 709/219 |
| 6,859,449 B2* | 2/2005 | Gronberg | .......... | H04L 1/1614 |
| | | | | 370/338 |
| 6,983,334 B2* | 1/2006 | Riedle | ............ | H04L 29/06 |
| | | | | 709/250 |
| 2007/0088799 A1* | 4/2007 | Luft | ............ | G06F 8/61 |
| | | | | 709/217 |
| 2008/0228787 A1* | 9/2008 | Merritt | ............ | H04L 1/1614 |
| 2015/0089017 A1* | 3/2015 | Arthur | ............ | H04L 67/06 |
| | | | | 709/217 |
| 2015/0295411 A1* | 10/2015 | Courtney | ............ | H02J 3/14 |
| | | | | 700/295 |
| 2016/0253170 A1* | 9/2016 | Fardig | ............ | G06F 8/68 |
| | | | | 717/170 |

OTHER PUBLICATIONS

K. Sollins, "The TFTP Protocol (Revision 2)", 1992, Network Working Group, RFC 1350, p. 1-11 (Year: 1992).*

Cheng, RS., Deng, DJ., Huang, YM. et al., "Cross-layer TCP with bitmap error recovery scheme in wireless ad hoc networks", Telecommunication Systems, 2010, vol. 44, No. 1-2, p. 69 (Year: 2010).*

* cited by examiner

OVER-THE-AIR BROADCAST BOOTLOADER PROTOCOL

This disclosure describes systems and methods allowing the efficient broadcast of new bootload images to a plurality of wireless network devices.

BACKGROUND

The proliferation of wireless devices has created an issue when the bootload image of those wireless devices needs to be updated. For example, consider a deployment where there are one hundred wireless devices. A new bootload image may be up to several megabytes in size.

Traditionally, the new bootload image is disseminated to these wireless devices by a central node, referred to as a server. The server will transmit hundreds or thousands of packets to a particular wireless device until the entirety of the new bootload image has been delivered. The server will then repeat this process with every other wireless device until all network devices have received the new bootload image.

In the case of large networks, with tens or hundreds of devices, the time and bandwidth required to download the bootload image to every device can be tremendous and prohibitive. For example, it may take hours to download the new bootload image to all of the wireless devices. This process also consumes bandwidth, which could be used for other purposes.

Therefore, it would be beneficial if there were a system and method for disseminating a new bootload image to a plurality of network devices in a faster, more efficient way.

SUMMARY

A system and method of disseminating bootload images through a wireless network are disclosed. The central node, or server, transmits segments of the bootload image using broadcast so that all wireless network devices receive the image at the same time. The server then individually queries each wireless device to determine whether there are any segments of the image that were not received by that particular wireless device. The server then retransmits, using broadcast, any segment that was not successfully received by all wireless devices. Once every wireless device has the entire image, the server may initiate the process of installing that bootload image.

According to one embodiment, a method of disseminating a bootload image from a server to a plurality of network devices is disclosed. The bootload image is made up of a plurality of segments, where each segment is transmitted in a network packet. The method comprises transmitting a first set of N segments from the server to the plurality of network devices, using N broadcast packets, where N represents a predetermined number; querying each of the plurality of network devices after the transmitting to determine which segments were not successfully received by each of the plurality of network devices; and retransmitting segments which were not successfully received by all of the plurality of network devices from the server to the plurality of network devices using broadcast packets. In a further embodiment, each of the plurality of network devices responds to the query by transmitting a bitmap of N bits to the server, wherein each bit represents an indication of whether a respective segment was successfully received. In certain embodiments, the querying and retransmitting are repeated until all of the plurality of network devices have received all segments in the first set. After this is completed, the method may further comprise repeating the transmitting, querying and retransmitting for additional sets of segments until all segments in the bootload image are delivered to the plurality of network devices.

According to another embodiment, a method of receiving a bootload image at each of a plurality of network devices from a server is disclosed. The bootload image is made up of a plurality of segments, where each segment is transmitted in a network packet. The method comprises receiving, at each of the plurality of network devices, a first set of N segments from a server, contained in N broadcast packets, where N represents a predetermined number; indicating, in a data structure disposed within each respective network device, whether each of the N segments was successfully received by each respective network device; and transmitting the data structure from a network device to the server in response to a query from the server. In a further embodiment, the method comprises receiving at the plurality of network devices, after the transmitting, a subset of the first N segments, wherein the subset represents segments that were not successfully received by all of the plurality of network devices. In certain embodiments, the receiving, indicating and transmitting are repeated until all of the plurality of network devices have received all segments in the first set. The method may then further comprise repeating the receiving, indicating and transmitting for additional sets of segments until all segments in the bootload image are delivered to the plurality of network devices.

In another embodiment, a network is disclosed. The network comprises a server and a plurality of network devices, wherein the server is configured to transmit a first set of N segments to the plurality of network devices, using N broadcast packets, where N represents a predetermined number; query each of the plurality of network devices after the transmitting to determine which segments were not successfully received by each of the plurality of network devices; and retransmit segments which were not received by all of the plurality of network devices to the plurality of network devices using broadcast packets; and wherein each of the plurality of network devices is configured to receive the broadcast packets from the server; create a data structure indicating which segments were successfully received; and transmit the data structure to the server in a network packet in response to the query from the server. In certain embodiments, the network devices utilize an IEEE 802.15.4 network protocol. In certain embodiments, the data structure comprises a bitmap of N bits, wherein the value of N is selected such that the bitmap fits within the network packet.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
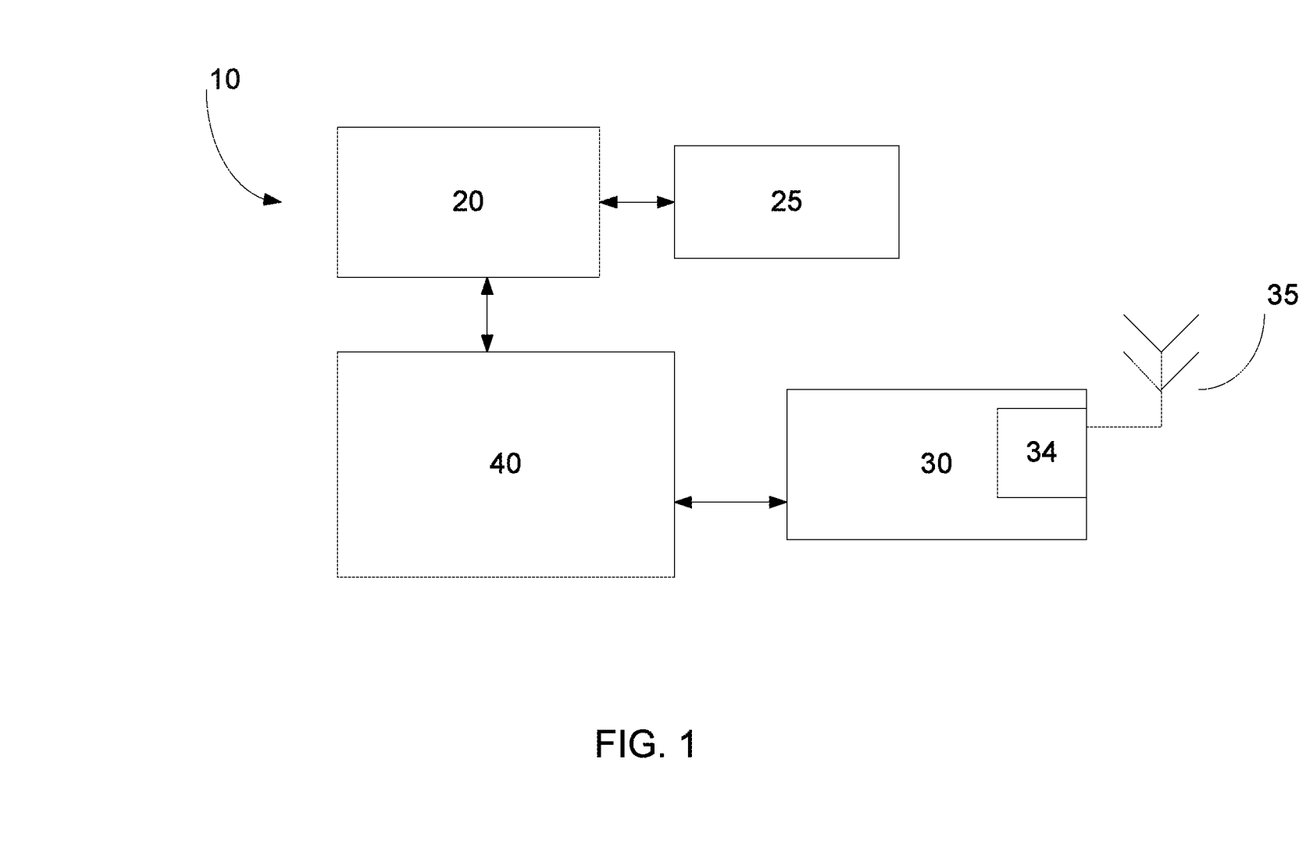
FIG. 1 is a block diagram of the network device.

FIG. 1 shows a block diagram of a representative network device 10. The network device 10 has a processing unit 20 and an associated memory device 25. This memory device 25 contains the instructions, which, when executed by the processing unit, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The network device 10 also includes a network interface 30, which is typically a wireless interface including an antenna 35. Additionally, the network interface may comprise a radio 34, which includes the baseband processing and MAC level processing. The network device 10 may include a second memory device 40 in which data that is received by the network interface 30, and data that is to be transmitted by the network interface 30, is stored. This second memory device 40 is traditionally a volatile memory. The processing unit 20 has the ability to read and write the second memory device 40 so as to communicate with the other nodes in the network. Although not shown, each network device 10 also has a power supply, which may be a battery or a connection to a permanent power source, such as a wall outlet.

Figure 2:
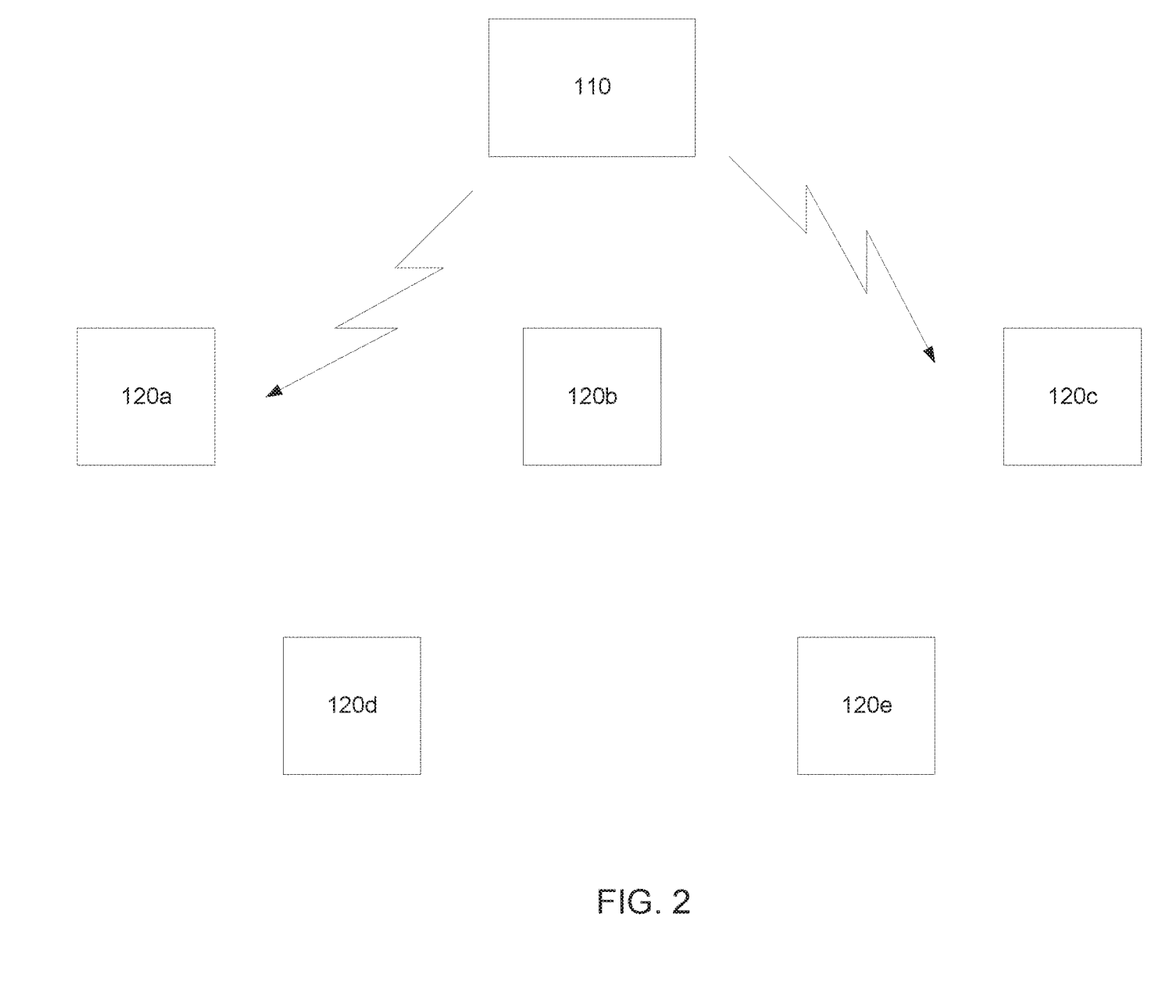
FIG. 2 shows a network having a server and a plurality of wireless network devices.

FIG. 2 shows a typical network topology. In this network 100, there is at least one server 110, which is the device that has the bootload image that needs to be distributed to the network devices 120a-120e. The bootload image may represent a new or updated version of code that is to be stored in memory device 25 and executed by the processing unit 20 in the network devices. The server 110 may have the same architecture as the other network devices, as shown in FIG. 1. In certain embodiments, the server 110 may have greater computing and memory capabilities and may be powered by a power source, such as an electrical outlet. However, in other embodiments, the architecture of the server 110 may be identical to that of the other network devices 120a-120e.

In certain embodiments, the server 110 may be able to communicate directly with each of the wireless network devices 120a-120e. In other words, the transmission power of the server 110 and the wireless network devices 120a-120e is sufficient to span the distance between the server 110 and the furthest wireless network device.

Figure 3:
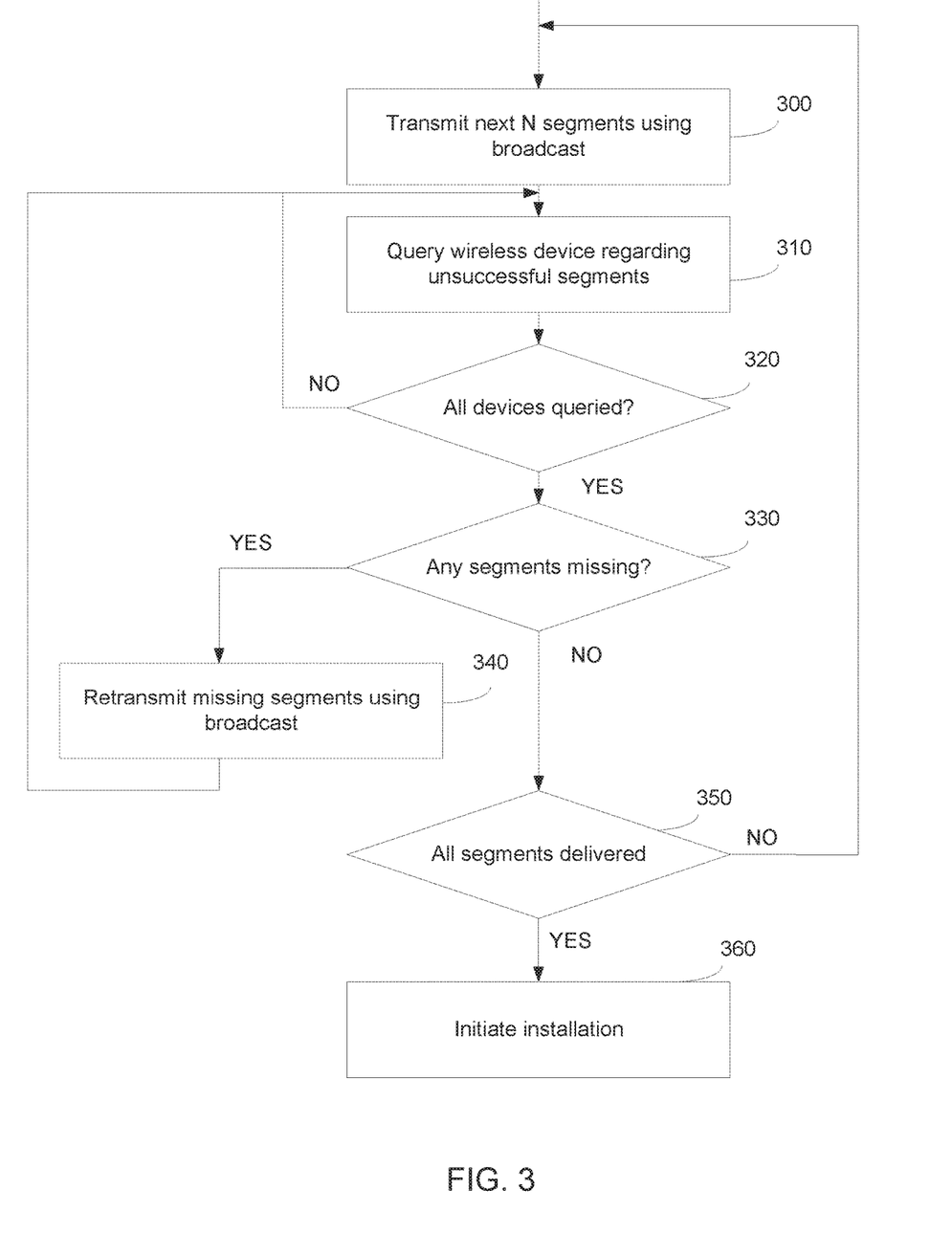
FIG. 3 shows a flowchart of a server's operation during the bootload process.

FIG. 3 shows a representative flowchart of a process executed by the server 110 in order to distribute a new bootload image to the wireless network devices 120a-120e.

The new bootload image is delivered in segments, where each segment is transmitted in a single network packet. For example, the wireless network protocol may be based on the IEEE 802.15.4 standard, which defines packet headers and packet lengths. In other embodiments, the wireless network protocol may be based on a different standard. A segment may be defined as the amount of information that can be transmitted in a single packet, where the packet size may be determined by the underlying network protocol. The size of a segment or packet is not limited by this disclosure. Further, the bootload image may also be identified by a version or image identification number.

The server 110 creates network packets, where the data field of each packet contains the version or image identification number of the bootload image, as well as one segment of data. The server 110 then begins transmission of these network packets using broadcast. Most network protocols include a mechanism whereby a single transmitted packet may be intended for more than one recipient. The transmission of a single packet from one source to multiple destinations is referred to as a broadcast transmission. In certain protocols, the header of the network packet includes the source address and the destination address. In a broadcast packet, the destination address may be set to a specific or reserved value that indicates that all wireless network devices should receive the packet.

As shown in Process 300, the server 110 transmits N packets, which comprise N segments of the new bootload image. The value of N is not limited by this disclosure. However, in certain embodiments, the value of N may be chosen such that the bitmap returned by the wireless network device 120a-120e can fit within a single packet, as will be described in more detail below.

These N segments are delivered using broadcast transmissions. Thus, all of the wireless network devices 120a-120e within the listening range of the server 110 will have received these N segments. However, it is possible that one or more wireless network nodes 120a-120e may not have correctly received one or more segments. Therefore, the server 110 may individually query the wireless network devices 120a-120e to determine whether each successfully received all N segments. As shown in Process 310, the server 110 queries a first wireless network device 120a using a unicast transmission to determine whether the first wireless network device 120a received all N segments successfully.

Figure 4:
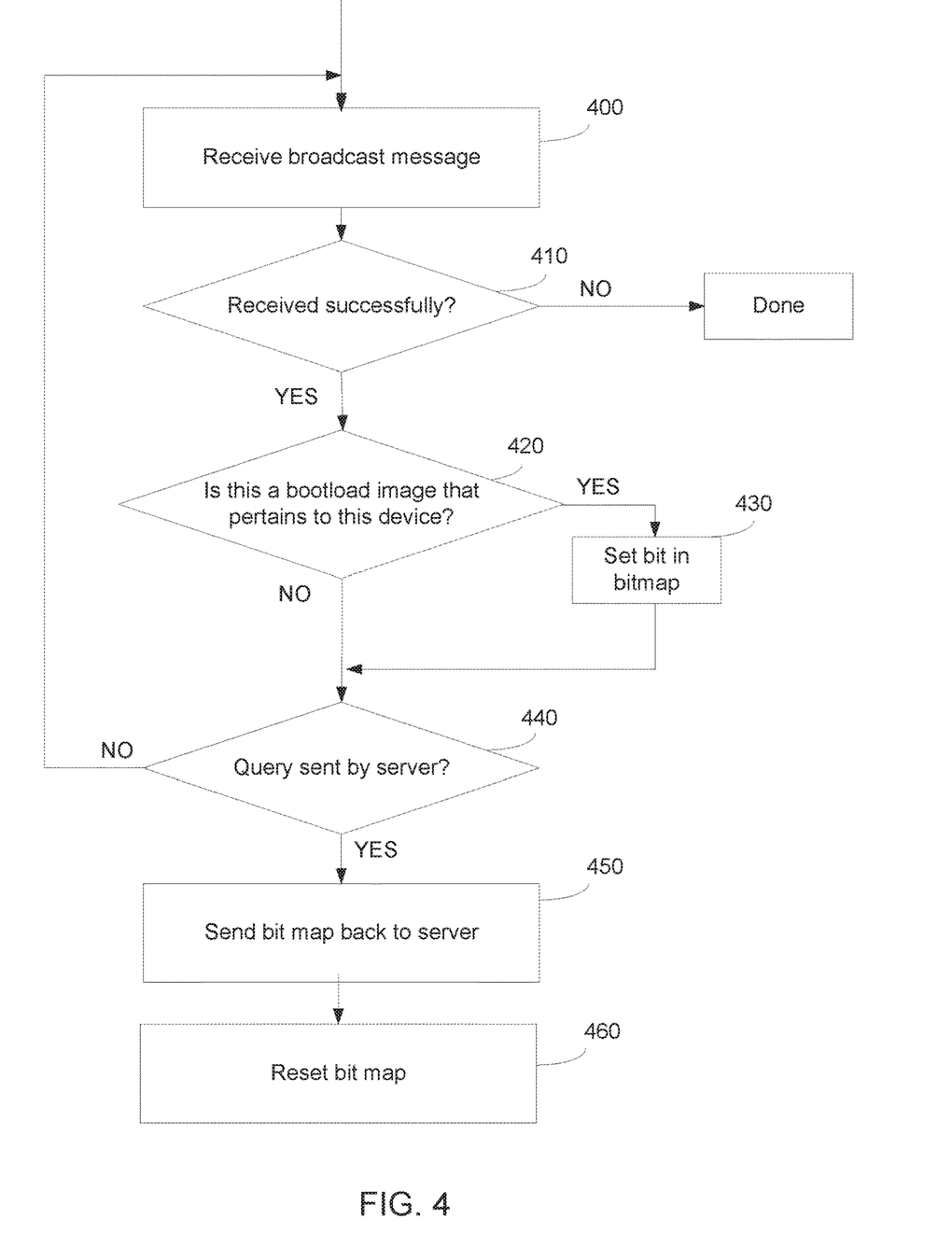
FIG. 4 shows a flowchart of a wireless network device's operation during the bootload process.

FIG. 4 shows the process used by the wireless network device 120a during the bootload process. This is the same process used by the other wireless network devices 120b-120e as well. As shown in Process 400, the wireless network device 120a receives a broadcast message. The client code first checks to insure that the message was successfully received, as shown in Process 410. If it was not, no further action is required. If the message was successfully received, the application layer resident in the wireless network device 120a is informed that a broadcast packet, which is a portion of a bootload image, has been received. The application is also provided with a version number that was set by the server's application layer upon initiating the image distribution process. The application layer checks the version number of the bootload image to determine whether this bootload image pertains to this wireless network device, as shown in Process 420. If this bootload image is not relevant to this wireless network device, the packet is ignored.

In the case where the application has accepted the request to initiate a download process, the client code at the wireless network device 120a sets a bit in a data structure, such as a bitmap, as shown in Process 430. This bitmap is N bits wide, where each bit represents one of the N segments. A set bit indicates that the segment corresponding to that bit position was successfully received. This process is repeated until all N broadcast messages have been transmitted, as shown in Process 440. After the transmission of the broadcast messages by the server 110, the bitmap in the wireless network device 120a comprises N bits, where a bit that is not set indicates that the wireless network device 120a either did not receive the corresponding segment at all, or received the segment in error.

After all N messages have been received, the server 110 will send a unicast message to the wireless network device 120a. The wireless network device 120a then returns its bitmap, as shown in Process 450. This bitmap represents the list of segments that were successfully received by this device. After the wireless network device 120a transmits the bit map to the server 110, the bit map is reset in preparation for the next set of broadcast messages, as shown in Process 460.

Returning to FIG. 3, this bitmap is the response that the server 110 receives in Process 310. The server 110 that queries the next wireless network device 120a-120e until all devices have been queried, as shown in Process 320. The server 110 may contain a list of devices which are intended to receive the bootload image. In this way, only devices to which the bootload image is relevant are queried by the server 110.

The server creates a bitmap which is a combination of the bitmaps received from all of the wireless network devices. In other words, if at least one of the wireless network devices 120*a*-120*e* indicates that a particular segment was not successfully received, the bit corresponding to that segment in the server's bit map is not set. In one embodiment, the server 110 initially sets all of the bits in its internal bitmap to one. The server than logically "ands" the bitmap that it receives from a wireless network device with its internal bitmap. Any bits in the received bitmap which are not set will cause the corresponding bit in the server's bitmap to be cleared. This process may be repeated for each bitmap received by the server 110.

In certain embodiments, the size of N is determined based on the size of the network packet. For example, if the size of the data portion of the packet is 100 bytes, the value of N may be set to 512. This value of N requires a bitmap that is 512 bits, or 64 bytes long. This bitmap may easily fit within a standard packet. Of course, the value of N may be another value if desired.

After all of the devices have been queried, the server 110 checks if any segments were not successfully received by all of the devices, as shown in Process 330. If at least one segment was not successfully received by at least one device, the server 110 retransmits the missing segments, as shown in Process 340. Note that to save bandwidth, the server 110 may only transmit the missing segments, rather than retransmitting all N segments. Further, the server 110 may retransmit these missing segments using broadcast messages. This minimizes the information that must be retained by the server 110. In other words, if unicast messages were used for the retransmissions, the server 110 would have to track each device and its missing segments individually. By using broadcast, only the identity of the missing segments needs to be retained by the server 110. Further, the use of broadcast allows the server 110 to only transmit each missing segment once, rather than one time for each wireless network device 120*a*-120*e* that did not receive the segment successfully.

If at least one segment was retransmitted (in Process 340), the server 110 then queries all of the wireless network devices 120*a*-120*e*, as shown in Process 310 and described above.

Once all N segments have been successfully delivered to all of the wireless network devices 120*a*-120*e*, the server 110 checks if there are more segments that need to be transmitted, as shown in Process 350. For example, the bootload image may comprise 2048 segments, which are delivered using a value of N=512. In that case, the Process 300 would be performed a total of four times. In certain situations, the total number of segments may not be a multiple of N. For example, the total number of segments may be 2248 segments. In this situation, the last time that Process 310 is performed, the final 200 segments are transmitted. Thus, N determines the maximum number of segments that are sent in Process 310. However, fewer than N segments may be transmitted if necessary.

While the above description indicates that the retransmissions are performed using broadcast messages in Process 340, other embodiments are possible. For example, in certain embodiments, the server 110 tracks each wireless network device and the segments that it is missing. For example, if a segment is only missing from one wireless network device, the server 110 may send a unicast message to that wireless network device with that particular segment.

Additionally, while Processes 310-320 indicate that all devices are queried to determine which segments are missing, other embodiments are also possible. For example, the server 110 may track which wireless network devices have received all of the segments already. When Processes 310-320 are repeated for a second or subsequent retransmission process, the server 110 may only query those wireless network devices which indicated during the previous query that they were missing segments. In other words, once a wireless network device indicates that it has received all of the segments, that device is not queried by the server 110 in Process 310 during any subsequent retransmissions.

For example, assume that there are two wireless network devices. After the initial broadcast messages (see Process 300), the server 110 queries the first device in Process 310, which indicates that it received all of the segments successfully. The server 110 then queries the second wireless network device, which indicates that it is missing at least one segment. The server 110 then retransmits the missing segments in Process 340. When the server 110 then queries the devices to determine whether any segments are missing, the server 110 does not query the first wireless network device, since that device had previously indicated that it has successfully received all of the segments. This optimization may save time and bandwidth, especially in networks with large numbers of devices.

When all of the segments have been delivered to all of the wireless network devices, the server 110 may initiate the global installation of the new bootload image.

In one embodiment, the server 110 sends a unicast message to each wireless network device 120*a*-120*e* instructing it to install the new image at a particular time. In networks where there is a global system clock, the server 110 may specify the time at which the installation is to begin.

In networks without a global system clock, the server 110 may provide a relative time to each device. For example, the server 110 may send a unicast message to a first wireless network device, informing that device to initiate an installation N milliseconds in the future. The server 110 then send a unicast message to a second wireless network device, informing that device to initiate an installation some time in the future. Since the second unicast message was sent M milliseconds after the unicast message to the first device, the server 110 will inform the second device to initiate an installation N-M milliseconds in the future. This process continues as the server sends messages to each device. With each successive message, the server indicates a shorter time until the initiation of the installation. For example, if each message is sent M milliseconds after the previous message, the tenth device will be instruction to initiate the installation N−9*M milliseconds in the future. Of course, the messages do not need to be sent at regular intervals. This example is simply to illustrate that each device is provided a shorter time until the initiation of the installation than the previous device.

The above disclosure describes an environment where the server 110 is able to communicate directly with all of the wireless network devices 120*a*-120*e*. However, in certain embodiments, the devices may be located such that there are one or more devices which are beyond the listening range of the server 110. For example, returning to FIG. 2, assume that wireless network device 120*e* cannot reliably receive or transmit messages to the server 110. In this configuration, one or more wireless network devices 120*a*-120*c* may act as secondary servers.

For example, the process described above may be used to download the bootload image from the server 110 to wireless network devices 120*a*-120*d*. Since wireless network device 120*e* cannot reliably receive communications from the server 110, it does not receive the new bootload image from server 110.

In certain embodiments, a particular device is statically identified as a secondary server. In other words, whenever a bootload process is initiated, the same device will act as a secondary server. In other embodiments, the secondary server may be dynamically selected by the server 110 based on the network topology and which devices did not receive the bootload image from the server 110. In yet other embodiments, the network designer may be responsible for determining, for each wireless network device, which other device will act as its server and insure that it receives the new bootload image. For example, the network designer may use the network topology and hierarchy to determine which devices will serve as secondary servers.

In these configurations, the server 110 performs the functions illustrated in FIG. 3, while wireless network devices 120*a*-120*d* perform the functions illustrated in FIG. 4. After all of the segments have been delivered to wireless network devices 120*a*-120*d*, the sequence of FIG. 3 is paused prior to Process 360 to allow the bootload image to be transmitted to wireless network device 120*e*. In one example, wireless network device 120*c*, which is within the listening range of server 110 and wireless network device 120*e*, becomes a secondary server. As stated above, this may be determined based on a predetermined designation, or may be decided by the server 110 based on the fact that server 110 realizes that wireless network device 120*e* did not receive the bootload image.

In some embodiments, server 110 maintains a list of all devices that should receive the new bootload image. The server 110 then passes a subset of this list to wireless network device 120*c*, where this subset represents the list of devices that will receive the bootload image from wireless network device 120*c*. In another embodiment, the server 110 only maintains a list of the devices for which it is responsible. In this embodiment, a separate list may be maintained in each secondary server, and may be created by the network designer or administrator.

In its role as a secondary server, wireless network device 120*c* now performs the functions illustrated in FIG. 3 and delivers the bootload image to the devices that are part of its list of devices. Thus, wireless network device 120*c* transmits the bootload image to wireless network device 120*e*. After this is complete, the wireless network device 120*c* informs the server 110 that the process is complete and the server 110 may orchestrate the initiation of an installation.

While the above example describes an embodiment where only one device receives the bootload image from a secondary server, it is understood that the disclosure is not limited to this embodiment. Any number of devices may receive the bootload image from a secondary server.

In some embodiments, the process used by the secondary servers may be optimized. For example, wireless network device 120*e* may be able to receive some packets from server 110, but is unable to reliably receive all of the segments. In this scenario, wireless network device 120*c*, in its role as a secondary server, may not perform Process 300 and move directly to Process 310. This optimization assumes that the wireless network device 120*e* received at least some of the segments directly from server 110.

Additionally, the present disclosure is not limited to only two layers of servers. For example, the concept of secondary servers may be extended to an arbitrary number of layers. For example, a second secondary server may receive the bootload image from a secondary server and then transmit that bootload image to other network devices. Similarly, one of these network devices may also then act as a secondary server to propagate the bootload image.

As described above, the instructions used to perform the sequences shown in FIGS. 3 and 4 may reside in the memory device of each wireless network device. The processing unit 20 executes these instructions to perform these sequences. For example, devices that act as servers execute instructions that perform the sequence shown in FIG. 3. Other devices execute the instructions that perform the sequence shown in FIG. 4. Devices that are designated as secondary servers execute instructions that perform the functions of both FIGS. 3 and 4.

These instructions may be installed in the network devices using a traditional bootload download process. For example, a bootload image is initially stored on a non-transitory storage medium. This bootload image may be transmitted to a server using traditional techniques. That server may then disseminate this bootload image to each wireless network device using traditional techniques. After installation, the memory device 25 of each device will contain the instructions allowing the processing unit 20 to perform these sequences.

Thus, prior to the installation, there exists a non-transitory storage medium that contains instructions, which when executed by the processing unit of a wireless network device, allow that wireless network device to execute the sequence shown in FIG. 4. Similarly, prior to the installation, there exists a non-transitory storage medium that contains instructions, which when executed by the processing unit of a server, allows that server to execute the sequence shown in FIG. 3.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of disseminating a bootload image from a server to a plurality of network devices, where the bootload image is made up of a plurality of segments, each segment transmitted in a network packet, comprising:

transmitting a first set of N segments from the server to the plurality of network devices, using N broadcast packets, where N represents a predetermined number and is less than all of the plurality of segments that constitute an entirety of the bootload image;

querying each of the plurality of network devices after transmitting the first set of N segments to determine which segments of the first set of N segments were not successfully received by each of the plurality of network devices; and retransmitting segments which were not successfully received by all of the plurality of network devices from the server to the plurality of network devices using broadcast packets after querying all of the network devices.

2. The method of claim 1, wherein each of the plurality of network devices responds to the query by transmitting a bitmap of N bits to the server, wherein each bit represents an indication of whether a respective segment was successfully received, and N is selected such that the bitmap can be transmitted in a single packet.

3. The method of claim 1, wherein the querying and retransmitting are repeated until all of the plurality of network devices have received all segments in the first set.

4. The method of claim 3, further comprising:
transmitting a second set of N segments from the server to the plurality of network devices using broadcast packets, after all of the plurality of network devices have received all of the segments in the first set;
querying each of the plurality of network devices after transmitting the second set to determine which segments of the second set were not successfully received by each of the plurality of network devices; and
retransmitting segments from the second set which were not received by all of the plurality of network devices from the server to the plurality of network devices using broadcast packets.

5. The method of claim 1, wherein N is 512.

6. The method of claim 1, wherein the querying and retransmitting are repeated until all of the plurality of network devices have received all segments in the first set, and further comprising:
repeating the transmitting, querying and retransmitting for additional sets of segments until all segments in the bootload image are delivered to the plurality of network devices.

7. The method of claim 1, further comprising using the server to initiate an installation of the bootload image on all of the network devices.

8. The method of claim 7, wherein the server transmits a message to each of the plurality of network devices to initiate the installation at a predetermined time.

9. A method of receiving a bootload image at each of a plurality of network devices from a server, where the bootload image is made up of a plurality of segments, each segment transmitted in a network packet, comprising:
receiving, at each of the plurality of network devices, a first set of N segments from a server, contained in N broadcast packets, where N represents a predetermined number and is less than all of the plurality of segments that constitute an entirety of the bootload image;
indicating, in a data structure disposed within each respective network device, whether each of the first set of N segments was successfully received by each respective network device; and
transmitting the data structure from a network device to the server in response to a query from the server, wherein the data structure comprises a bit map having N bits, wherein each bit in the bitmap is used to represent whether a respective segment was successfully received, and N is selected such that the data structure can be transmitted in a single packet.

10. The method of claim 9, further comprising:
receiving at the plurality of network devices, after the transmitting, a subset of the first N segments, using broadcast packets, wherein the subset represents segments that were not successfully received by all of the plurality of network devices.

11. The method of claim 10, further comprising:
indicating, in the data structure disposed within each respective network device, whether each of the subset of the first N segments was successfully received by each respective network device; and
transmitting the data structure from a network device to the server in response to a query from the server.

12. The method of claim 9, wherein the receiving, indicating and transmitting are repeated until all of the plurality of network devices have received all segments in the first set, and further comprising:
repeating the receiving, indicating and transmitting for additional sets of segments until all segments in the bootload image are delivered to the plurality of network devices.

13. The method of claim 12, wherein the plurality of network devices install the bootload image after all segments in the bootload image are delivered to the plurality of network devices.

14. The method of claim 9, wherein each of the N segments contains an indication of the identity of the bootload image, and each network device determines whether the bootload image is relevant to that network device.

15. A network, comprising:
a server and a plurality of network devices, wherein the server is configured to:
transmit a first set of N segments to the plurality of network devices, using N broadcast packets, where N represents a predetermined number and is less than all of the plurality of segments that constitute an entirety of the bootload image;
query each of the plurality of network devices after transmitting the first set of N segments to determine which segments of the first set of N segments were not successfully received by each of the plurality of network devices; and
retransmit segments which were not received by all of the plurality of network devices to the plurality of network devices using broadcast packets after querying all of the network devices; and
wherein each of the plurality of network devices is configured to:
receive the broadcast packets from the server;
create a data structure indicating which segments were successfully received; and
transmit the data structure to the server in a network packet in response to the query from the server.

16. The network of claim 15, wherein the network devices utilize an IEEE 802.15.4 network protocol.

17. The network of claim 15, wherein the data structure comprises a bitmap of N bits, wherein each bit is used to represent whether a respective segment was successfully received.

18. The network of claim 17, wherein the value of N is selected such that the bitmap fits within the network packet.

* * * * *